US008999195B2

(12) United States Patent
Chu et al.

(10) Patent No.: US 8,999,195 B2
(45) Date of Patent: Apr. 7, 2015

(54) SMECTIC A COMPOSITIONS FOR USE IN OPTICAL DEVICES

(75) Inventors: Daping Chu, Cambridge (GB); Huan Xu, Cambridge (GB); William Alden Crossland, Harlow (GB); Anthony Bernard Davey, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 0 days.

(21) Appl. No.: 13/978,805

(22) PCT Filed: Jan. 9, 2012

(86) PCT No.: PCT/GB2012/000017
§ 371 (c)(1),
(2), (4) Date: Sep. 13, 2013

(87) PCT Pub. No.: WO2012/095627
PCT Pub. Date: Jul. 19, 2012

(65) Prior Publication Data
US 2013/0342773 A1  Dec. 26, 2013

(30) Foreign Application Priority Data
Jan. 10, 2011  (GB) .................................. 1100375.3

(51) Int. Cl.
C09K 19/52 (2006.01)
C09K 19/54 (2006.01)
C09K 19/58 (2006.01)
C09K 19/40 (2006.01)
G02F 1/1333 (2006.01)
C09K 19/02 (2006.01)

(52) U.S. Cl.
CPC .............. *G02F 1/1333* (2013.01); *C09K 19/02* (2013.01); *C09K 19/408* (2013.01); *C09K 19/52* (2013.01); *C09K 19/582* (2013.01)

(58) Field of Classification Search
USPC .................. 252/299.01, 299.1, 299.2, 299.5; 349/41, 113, 183, 184
See application file for complete search history.

(56) References Cited

U.S. PATENT DOCUMENTS

| 4,139,273 | A | 2/1979 | Crossland et al. |
| 4,291,948 | A | 9/1981 | Crossland et al. |
| 4,419,664 | A | 12/1983 | Crossland et al. |
| 4,703,305 | A | 10/1987 | Ayliffe |
| 5,455,697 | A | 10/1995 | Coles et al. |
| 5,547,604 | A | 8/1996 | Coles et al. |
| 8,357,312 | B2 | 1/2013 | Sun |
| 2006/0091358 | A1 | 5/2006 | Netland et al. |
| 2011/0080553 | A1 | 4/2011 | Sun |
| 2013/0155340 | A1 | 6/2013 | Clapp et al. |

FOREIGN PATENT DOCUMENTS

| EP | 0529597 A1 | 3/1993 |
| WO | WO 2004022670 A1 | 3/2004 |
| WO | WO 2006003171 A1 | 1/2006 |
| WO | WO 2006035213 A2 | 4/2006 |
| WO | WO 2009111919 A1 | 9/2009 |
| WO | WO 2010/070606 A1 | 6/2010 |
| WO | WO 2011115976 A1 | 9/2011 |

OTHER PUBLICATIONS

Chmielewski, A.G., et al, "Reological Properties of Some Biphenyl Liquid Crystals," Rheologica Acta, vol. 23, 207-210, 1984.
Crossland, A., et al, "Electrically Induced Scattering Textures in Smectic A Phases and Their Electrical Reversal", Ann. Phys., vol. 3, No. 2-4, pp. 325. 1978.
Crossland, W.A., et al, "An Electrically Addressed Smectic Storage Device", Proc.SID Int. Symp, Orlando Florida, Digest of Technical Papers, 124-127, 1985.
Crossland, W.A., et al, "Electronically Addressed Smectic Storage Device For Large Flat Panel Displays," Electrical Communications, 60, (1), 87-93, 1986.
Crossland, W.A., et al., "An Evaluation of Ametic Dynamic Scattering for High Complexity Displays With On-Screen Memory," Proc. SID, 23, (1), 1982.
Crossland, W.A., et al., "Large Panel Displays Using Smectic Memory LCDs", Electrical Engineering 35, Aug. 1985.
Davey, A. B., et al, "Dyed Smectic A Liquid Crystals for Colour Reflective Displays," Proc. Latindisplay 2007, pp. 107-111, Nov. 2007.

(Continued)

*Primary Examiner* — Shean C Wu
(74) *Attorney, Agent, or Firm* — Howard & Howard Attorneys PLLC

(57) ABSTRACT

A liquid crystal smectic A composition that can be switched by the application of different electric fields across it between a first stable state (left hand block in FIG. 4) and at least one second stable state (right hand block in FIG. 4) in which the composition is less ordered than in the first state. The radiation transmission properties of the first and second states are different. The composition comprises: (A) a liquid crystal material that has a positive dielectric anisotropy and that is a uniformly aligned smectic A structure when in the first state; (B) an ionic dopant giving a negative conductivity anisotropy in the liquid crystal material so that it is capable of disrupting the smectic A structure of the first state when subject to an electric field that causes the dopant to migrate through the composition, thereby causing the composition to switch into said at least one second state, and (C) optically anisotropic pigment particles having positive dielectric anisotropy dispersed in the composition, the largest dimension of the pigment particles being in the range of 10 nm to 1 μm. The composition, when in the first relatively stable state, is capable of undergoing smectic dynamic scattering due to electro-hydrodynamic instability under the influence of a sufficiently low frequency AC field, thereby disordering the liquid crystals and the pigment particles and thereby discouraging the pigment particles from aggregating together. The composition is suitable for use in displays and is especially resistant to degradation by ambient light and so can be used in outside applications.

29 Claims, 5 Drawing Sheets

(56) References Cited

OTHER PUBLICATIONS

Blinovet al., "Electro-Optic Effects in Liquid Crystal Materials"; Springer Verlag, 358-359, 1994.

De Gennes, PG., "The Physics of Liquid Crystals," Smectics, 288-301, 1974.

English language abstract for WO 2009/111919 extracted from espacenet.com database on Apr. 23, 2013, 30 pages.

PCT International Search Report for PCT/US2011/028495, dated Aug. 26, 2011, 4 pages.

PCT International Search Report for PCT/GB2012/000017, dated Apr. 17, 2012, 4 pages.

Brunsveld et al., "The Influence of Lithium Perchlorate on Discotic Liquid Crystals and the Ion Conduction of Their Mixtures," Mol. Crys. Liq. Cryst., 1999, vol. 331, pp. 449-456.

Coates, D. et al, "Dielectric and Conductivity Studies of Smectic A Materials towards improved Dynamic Scattering Display Characterics," Proceedings of Eurodisplay, pp. 96-99, 1987.

Coates, D. et al, "Electically Induced Scattering Textures in Smectic A Phases and their Electrical Reversal," J. Phys. D. (Applied Phys), vol. 11, p. 1, 1978.

Coates, D., et al, "A Variable Tilt SmA Electro-Optic Effect Giving Stored Colors," Mol. Cryst. & Liq. Cryst., vol. 41 (letters), pp. 151-154, 1978.

Crossland, W.A., "An Electrically Addressed Smectic Storage Device," SID 1985 Digest, pp. 124-127.

Dias, et al, "Ionic conduction of lithium and magnesium salts within laminar arrays in a smectic liquid-crystal polymer electrolyte," J. Chem. Soc., Faraday Trans., 1996, 92(14), p. 2599-2606.

Finkelmann, Heino, et al, "Investigations on Liquid Crystalline Polysiloxanes, 1 Synthesis and Characterization of Linear Polymers," Makromol. Chem., Rapid Commun. 1, 31-34 (1980).

Gardiner, et al, "Enhancing lifetime in bistable smectic A liquid crystal device," J. Phys. D: Appl. Phys. 40 (2007), pp. 977-981.

Geurst, J.A., et al, "Theory of Electrically Induced Hydrodynamic Instabilities in Smectic Liquid Crystals," Physics letters, vol. 41, No. 4, Oct. 4, 1972, pp. 369-370.

Gray, George W., "Preparation of Liquid Crystalline Polysiloxanes With Terminal Cyano Groups In The Side Chains," Makromol. Chem., Rapid Commun. 7, pp. 71-76 (1986).

Newton, et al, "Synthesis and Properties of Low-molar-mass Liquid-crystalline Siloxane Derivatives," J. Mater. Chem., 1994, 4(6), pp. 869-874.

Tschierski, Casten, "Non-conventional liquid crystals—the importance of micro-segregation for self organisation," J. Mater. Chem., 1998, 8(7), pp. 1485-1508.

SMECTIC A COMPOSITIONS FOR USE IN OPTICAL DEVICES

RELATED APPLICATIONS

This application is the National Stage of International Patent Application No. PCT/GB2012/000017, filed on Jan. 9, 2012, which claims priority to and all the advantages of Great Britain Patent Application No. GB 1100375.3, filed on Jan. 10, 2011, the content of which is incorporated herein by reference.

TECHNICAL FIELD

The present invention relates to liquid crystal compositions having a smectic A structure, cells containing such a composition sandwiched between a pair of electrodes, an optical device containing one or more multiple cells and a method of switching the optical properties of the composition by applying an electric field thereto.

BACKGROUND TO THE INVENTION

Smectic liquid crystals (LC) are materials that, upon cooling from the isotropic (liquid) phase and before solidification, can form a liquid crystalline phase having a layered structure in which the liquid crystal molecules show various morphologies within the layers. The various morphologies give rise to a number of different smectic phases designated by the letters A, B, C, etc. the most common of which is smectic A (SmA). The SmA phase has LC molecules orthogonal to the layers but randomly distributed within the layers it is therefore one of the least ordered of the Smectic phases. X-ray studies show a weak density wave, characteristic of well defined layer spacing and the materials are distinct from nematic phases both via microscopy and in visco-elastic and other properties.

Most optically inactive SmA materials are linear and rod-like (sometimes referred to as "lath"-like) and usually have a positive dielectric anisotropy, i.e. the average direction of the long molecular axis (indicated by a vector called the 'director') of the molecules will align with the gradient in an electric field applied across a film of smectic A liquid crystals present between two substrates (e.g. made of glass). If the substrates act as electrodes sandwiching the film, the directors will then lie orthogonal to the substrates. This orientation is referred to as 'homeotropic alignment'.

"8CB" (4'-octyl-4-biphenylcarbonitrile) and "8OCB" (4'-(octyloxy)-4-biphenylcarbonitrile) are examples of materials that exhibit a SmA phase when cooled from the higher temperature nematic phase.

In the homeotropic alignment, all the SmA LC molecules are arranged in layers between the substrates; the layers extend in a direction parallel to the substrates and, as stated above, the directors of individual LC molecules are substantially orthogonal to the plane of the substrates. The homeotropic SmA structure can be disrupted and broken up into domains and the uniform structure will be maintained separately in each domain. The greater the number of domains, the less ordered the state of the SmA material will be and conversely the smaller the number of domains, the more ordered the material will be. Even in an extreme case of disorder, the orientation of the layers in the different domains will not be completely random.

SmA liquid crystals are optically anisotropic and so the greater the number of domains present, the greater the light scattering. This is sometimes referred to as the 'scattering state'. In a uniform homeotropic state, a SmA composition will appear transparent and this is sometimes referred to as the 'clear state'. However, the same SmA composition, when in the scattering state, in suitably thick samples can scatter light to such an extent that it is opaque.

A test cell containing the SmA composition may be formed by taking planar glass sheets coated with a transparent conducting layer, typically made of indium tin oxide. These two sheets may be formed into a thin cell for example separated by spacers of uniform diameter (typically, above 5 micrometers, dependent on the desired cell thickness). This cell is normally edge sealed with glue allowing apertures for filling. A SmA liquid crystal layer may be formed by filling the cell (typically at an elevated temperature above the isotropic transition for the material). The application of wires to contact the conducting glass allows a field to be applied across the liquid crystal layer. In the SmA devices discussed here, no alignment layers need be used, in strong contrast to nematic display-type devices where uniform alignment of the cell is a requisite of their operation.

To electrically address a SmA liquid crystal cell, an alternating (AC) field is normally applied in order to avoid damage to the liquid crystal by electrochemical reactions at the electrodes as are normally obtained using DC (and low frequency AC <50 Hz). For materials that do not contain ionic dopants (explained below), the dielectric anisotropy of the LC will cause them to rearrange and align with the applied field direction (normal to the substrate surface). Under such a condition, the cell (viewed in transmission or normal to its surface), will typically appear clear. The SmA material is now in an ordered mono-domain, with the layers of the material lying parallel to the substrate and the directors of the individual LC molecules lying orthogonal to the layers and to the substrates. For many SmA materials this situation is only reversible by re-heating the cell to a nematic phase and so destroying the SmA alignment.

Because the switching from a clear state to a scattering state can only be reversed by such heating and subsequent cooling, SmA liquid crystals, with positive dielectric anisotropy, cannot alone form the basis of a practical electro-optic phenomenon. However a light scattering state can be electrically induced from a mono-domain clear state by smectic dynamic scattering (SDS), as described below, that disrupts the mono-domain state to form multi-domains, which allows a display to be reversibly switched between a homeotropically aligned clear transparent state and a disordered light scattering state. These two states are visible without polarised light.

Smectic dynamic scattering uses a suitable ionic dopant that is dissolved in the smectic A liquid crystal host; under the influence of low frequency (e.g. <500 Hz) electric fields, two orthogonal forces attempt to reorient the SmA director. Dielectric re-orientation, as described above, attempts to align the SmA director (indicating the average direction of the long molecular axis) in the field direction, i.e. orthogonal to the plane of the electrodes/substrates. Simultaneously, the movement of dopant ions through the SmA electrolyte attempts to align the SmA director in the direction in which ions find it easier to travel. In SmA materials this direction is within the SmA layers, which lie orthogonal to the field direction, i.e. SmA materials have a "negative conductivity anisotropy". The cumulative effects of the movement of the ionic charges leads to a field arising in the plane of the layers that attempts to align the SmA director in a direction parallel to the plane of the electrodes/substrates. The two competing forces give rise to an electro-hydrodynamic instability in the liquid crystal fluid that is referred to as 'dynamic scattering' or smectic dynamic scattering (SDS). If the dopant ions are present in sufficient quantity, the scattering caused by the transit of the ions dominates the dielectric orientation of the LCs, thereby forming a disordered scattering state in which the SmA material scatters light, as described above.

The reversibility between the clear, uniformly oriented state and the ion-transit induced, poly-domain, scattering state, depends upon the frequency of the applied electric field. Dynamic scattering requires the field driven passage of ions through the liquid crystal. It therefore occurs only with DC or low frequency AC drive. At higher frequencies the ions cannot react fast enough to the changing field frequency and so do not move sufficiently to induce a scattering state. However, at such higher frequencies, the dielectric reorientation of the LCs due to the electric field across the material still occurs. Therefore, if a high frequency ac field is applied to a SmA material in a disordered polydomain state, the field re-orientates the LCs thereby re-establishing a uniform orientation of the molecules in an ordered homeotropic SmA state.

One particular characteristic of SmA liquid crystals is a marked bi- or multi-stability in their switching to the extent that dielectric re-orientation (or other disturbances of the smectic structure) does not relax when the electric field is removed (see Crossland et al [P4 and ref. 6]), i.e. unlike most nematic liquid crystal structures, dielectrically re-oriented SmA liquid crystals remain in the driven state until further forces are applied.

It can therefore be seen that the combination of dielectric re-orientation (into a clear transparent state) and dynamic scattering (into a light scattering state) in a suitably doped SmA phase (possessing a positive dielectric anisotropy and a negative conductivity anisotropy) can form the basis of an electrically addressed display (and other optical devices) and is used in the present invention. High frequencies (variable, but typically $\geq 500$ Hz) drive the SmA layer into an optically clear ordered state and low frequencies (variable, typically dc or <500 Hz) drive it into the light scattering disordered state. A key feature of such a display is that both these optical states can be set up using short electrical pulses, and both persist indefinitely, or until they are re-addressed electrically. This is not true of the related phenomena in nematic liquid crystals. It is this property of electro-optic bistability (or more accurately multi-stability since a range of different stable states are possible) that allows SmA dynamic scattering displays to be matrix addressed without pixel circuitry and which results in their extremely low power consumption in page-oriented displays or in smart windows.

The phenomenon of dynamic scattering in SmA liquid crystals was predicted by Geurst and Goosens in 1972 (ref 8). It was first observed and identified by Crossland et al 1976 (ref P1) who proposed displays based on this phenomenon and dielectric re-orientation and described their structure and electrical addressing (refs. 1-3 and P1, P2, P3). Subsequently highly multiplexed passive matrix displays were demonstrated with good viewing characteristics based on efficient switching between clear and scattering states (refs 4). The background on SmA liquid crystals as a phase of matter is widely covered in the liquid crystal literature (e.g. in the books ref 9).

SmA displays are generally viewed against a black background and could be illuminated (e.g. using a transparent plastic light guide lit at the edges) or used without artificial illumination as reflective displays. They were also used as efficient projection displays because the clear areas are highly transparent (no polarising films are needed) and the scattering textures efficiently scatter light out of the aperture of projection lenses.

A second method of generating contrast in optical devices using SmA materials and the above-described electro-optic effects was also disclosed in P1 (Crossland et al 1976): if a suitable dichroic dye is dissolved in the SmA then the dye orientation is randomised in the scattering state, which therefore appears coloured. The clear state however orients the dye absorption axis so that it lies orthogonal to the liquid crystal layer (and the direction of view) so its absorption band is not apparent and it appears colourless or only weakly coloured. This 'guest-host' effect (where the dye is the guest in the SmA host) switches between the dye colour and white when viewed against a white background. Displays have been fabricated using dyes of various colours (including mixtures of dichroic dyes to give black) and devices employing, for example, anthraquinone based dyes exhibited good contrast and photochemical stability.

In outdoor applications, however, sunlight tends to bleach the dyes and this shortens the lifetime of SmA displays of the type discussed above. It is this problem that the present invention addresses.

This invention relates to displays as described above, in which a disordered state is produced by the process of SmA dynamic scattering and a uniform ordered state, which (depending on the LC composition) is typically clear, is induced by dielectric re-orientation. Here they are referred to as SmA dynamic scattering (SDS) displays or devices. These two states are equally stable allowing arrays of pixels of any size to be addressed as line-at-a-time without the use of pixel circuitry. Such line-at-a-time display drivers are well known.

SmA dynamic scattering displays have not heretofore been attractive for main-stream video display development due to lifetime limitations and nematic liquid crystals have largely been favoured. However, with emergent requirements for electronic display systems of superior energy efficiency the SmA materials offer several significant intrinsic advantages. In particular SmA materials are very attractive for information displays where video performance is not requisite and high energy efficiency, and quite possibly ambient lit operation, is desired (reflective display systems).

A typical example of such a display is provided by metropolitan information systems (e.g. displays of road-traffic information, public transport timetables, visitor information etceteras). Such will need to operate in a quasi continuous up-date mode, with some sites requiring full exposure to sunlight, others being sited where frequent maintenance is difficult. Such applications will thus require refresh rates that are reasonable and provide a readable experience (for comparison, consider the experience of reading and turning a page of a book or magazine). Similarly with continuously refreshed and paged data, the expectation for acceptable lifetime must suggest that the screen can be refreshed many times, say, for a service life of 3 to 5 years (if we assume pages will be refreshed every 10 seconds then this would imply that the display must operate between 10 and 16 Million refresh cycles). Naturally this operation scenario is not the only consideration, but it does provide a useful guideline for the fabrication of practical devices.

The use of SmA SDS in reflective, and front and/or backlit, display systems goes back to the 1970s and 1980s when early trials of SmA materials in a scattering display mode were evaluated for point-of-sale display, information systems, electronic books and electronic displays for overhead projectors (see Crossland et al ref 4). The choice between using dyed or un-dyed systems has historically been dependent upon application specifications but dyed systems have not been usable in outdoor applications because of the bleaching problems mentioned.

WO 2006/003171 (P8) discloses a liquid crystal display comprising a liquid crystal composition sandwiched between a pair of electrodes. Anisotropic light-absorbing particles, which may be colloidal particles or pigments, are dispersed within the composition and align themselves with the liquid crystals of the composition. The liquid crystal used in this disclosure was 4-pentyl-4'-cyanobiphenyl, a single compound nematic liquid crystal (K15, Merck), which is not a SmA liquid crystal material. A further indication that the device disclosed in this document is not a SmA display comes from the disclosure that the device requires an alignment layer in order to align the liquid crystals, which is not needed for aligning a SmA liquid crystal composition but is essential for aligning a nematic liquid crystal composition. Furthermore, the schematic diagrams shown do not include the characteristic smectic A "layered" structure.

WO/2011/115976 discloses a thermotropic liquid crystal smectic A composition exhibiting a smectic type A phase made up of multiple layers and capable of forming a liquid crystal optical device, e.g. a display, when sandwiched between a pair of electrodes, wherein:

under the influence of different electric fields applied between the electrodes, the alignment of the layers of the composition can become more ordered or more disordered, the composition has stable states in which the alignment of the layers of the composition are differently ordered including an ordered state, a disordered state and intermediate states, the composition being such that, once switched to a given state by an electric field, it remains substantially in that state when the field is removed, which composition comprises, in weight %:

(a) 25-75% in total of at least one siloxane of the general formula I:

$$X-\underset{R}{\overset{R}{\underset{|}{Si}}}-O-\left[\underset{R}{\overset{R}{\underset{|}{Si}}}-O\right]_p-(CH_2)_q-[O]_t-[A]_k-Z \quad (I)$$

wherein
- p=1 to 10, e.g. 1 to 3,
- q=1 to 12, e.g. 6 to 10,
- t=0 or 1,
- k=2 or 3,
- A is a phenyl or cyclohexyl ring which may be the same or different and are bonded together in para positions,
- R=a $C_{1-3}$ alkyl group, e.g. methyl, which may be the same or different,
- X=a $C_{1-12}$ alkyl group, and
- Z=F, Cl, Br, I, CN, $NH_2$, $NO_2$, $NMe_2$, NCS, $CH_3$, or $OCH_3$, $CF_3$, $OCF_3$, $CH_2F$, $CHF_2$ especially CN;

(b) 0.001-1% in total of at least one quaternary ammonium salt of the general formula II:

$$T \diagup_v \underset{R1}{\overset{R3}{\underset{|}{N^+}}}-R2 \quad Q^- \quad (II)$$

wherein:
- T=a methyl group or a silyl or siloxane group and
- v=1 to 30, for example v=9 to 19, e.g. myristyl (v=13, T=methyl) or cetyl (v=15 and T=methyl),
- R1, R2 and R3, which may be the same or different, are $C_{1-4}$ alkyl, e.g. methyl or ethyl,
- $Q^-$ is an oxidatively stable ion, especially a $ClO_4^-$ ion, (c) 20-65% in total of at least one polarisable linear molecule having an alkyl chain, the molecule having the general formula III:

$$D-A'_k-Y \quad (III)$$

wherein:
- D stands for a $C_{1-16}$ straight chained alkyl or alkoxy group optionally containing one or more double bonds;
- k=2 or 3,
- A' is a phenyl, cyclohexyl, pyrimidine, 1,3-dioxane, or 1,4-bicyclo[2,2,2]octyl ring, wherein each A may be the same or different and are bonded together in para positions, the terminal ring attached to Y optionally being a phenyl and
- Y is located in the para position of the terminal ring of the group $A'_k$ and is selected from Z (as defined above in connection with Formula I), $C_{1-16}$ straight chained alkyl, $C_{1-16}$ straight chained alkoxy, $OCHF_2$, $NMe_2$, $CH_3$, $OCOCH_3$, and $COCH_3$; and (d) 2-20%, optionally 5-15, in total of at least one side chain liquid crystal polysiloxane of the general formula IV:

$$Y-R_2SiO-\left[\underset{R}{\overset{R}{\underset{|}{Si}}}-O\right]_a\left[\underset{R}{\overset{R}{\underset{|}{Si}}}-O\right]_b\left[\underset{\underset{(O)t-[A]_k-Z}{|}}{\overset{R}{\underset{|}{Si}}}-O\right]_c SiR_2-Y \quad (IV)$$

$(CH_2)m$ on b unit; H on c unit wherein:
- a, b and c each independently have a value of 0 to 100 and are such that a+b+c has an average value in the range 3 to 200, e.g. 5 to 20; and a is such that the chain units of the formula $Y-R_2SiO-[SiR_2-O]_a$ represents 0 to 25 mole percentage of the compound of the general formula IV, and c is such that the units of the formula chain $-[SiHR-O]_c-R_2SiO-Y$ represents 0 to 15 mole percentage of the compound of the general formula IV,
- m=3 to 20, e.g. 4 to 12;
- t=0 or 1,
- k=2 or 3
- A is a phenyl or cyclohexyl ring which may be the same or different and the rings are bonded together in para positions,
- R=a $C_{1-3}$ alkyl group, e.g. methyl, each of which may be the same or different, and
- Y=a $C_{1-12}$ alkyl group, a chromophore or a calamitic liquid crystal group and each of which may be the same or different, and
- Z is as defined above in connection with Formula I.

and wherein the amounts and nature of the components are selected such that the composition possesses smectic A layering and siloxane-rich sub-layering, as detected by X-ray diffraction.

The compositions of WO/2011/115976 can be used as a basis of the compositions of the present invention and the contents of this specification are incorporated by reference.

DISCLOSURE OF THE INVENTION

We have found a liquid crystal SmA composition that is much more stable to light than the corresponding known compositions containing dyes, which allows it to be used in an optical device that can be located in a position where it is exposed to high levels of incident radiation. The present invention is partly based on the use of pigment particles instead of dyes in a SmA liquid crystal composition. It is believed that the compositions containing pigment particles are much more stable to light than dyes because of the bulk of the pigment particles which means that, if ambient radiation degrades a molecule in a pigment particle, other molecules remain in the particles that will provide the colouring effect. However, one of the problems of including small particles, such as pigment particles, in a liquid crystal composition is that they tend to clump together over time. The present invention is partly based on a solution to this problem since it has been found that small pigment particles in a SmA liquid crystal composition that is switchable between at least two states by the application of different electrical fields across the composition can be retained without clumping for a considerable period of time because of the high viscosity of the smectic composition and is assisted by the dynamic scattering processing itself, as explained in more detail below.

Thus the present invention provides a thermotropic liquid crystal SmA composition that can be switched, by the application of different electric fields across it, between a first stable state and at least one second stable state. The radiation transmission properties of the first and second states are different for at least one wavelength. The composition comprises:
(A) a liquid crystal material that has positive dielectric anisotropy and that has a homeotropic SmA structure when the composition is in the aforementioned first state;
(B) an ionic dopant giving a negative conductivity anisotropy in the LC composition and being capable of disrupting the homeotropic SmA structure of the first state when subject to an electric field that causes the dopant ions to migrate through the composition, thereby causing the composition to switch into one of said at least one second states, and
(C) optically anisotropic pigment particles having a positive dielectric anisotropy dispersed in the composition, the largest dimension of the pigment particles being in the range of 10 nm to 1 μm.

The composition, when in the first relatively stable state, is capable of undergoing smectic dynamic scattering due to electro-hydrodynamic instability under the influence of a sufficiently low frequency AC field, thereby disordering the liquid crystals and the pigment particles and thereby discouraging the pigment particles from aggregating together.

The amounts and nature of the components are selected such that the composition possesses SmA layering at 25° C., as detected by X-ray diffraction and shows the characteristic SmA textures (e.g. fan textures) in a polarising microscope.

The present invention also extends to the use of such a composition in optical devices, e.g. displays, in which the composition is sandwiched between a pair of electrodes that apply the electric field. The devices may be as described below.

As used in the present specification and claims, the term "optical device" is not limited to devices operating in the visible spectrum and covers devices that operate, for example in the microwave spectral region where a device of the present invention can modulate a beam of microwave radiation, depending on the dielectric tenability of the composition defined above.

The present specification specifies various particle sizes for the pigment. It will be appreciated that it is difficult to control all the particles so that they fall within a given range and it is within the scope of the present invention if at least 90 wt % fall in the specified range and 10% or less (preferably 5% or less) preferably fall within 100 nm of the range.

DETAILED DESCRIPTION OF THE INVENTION

Figure 1A:
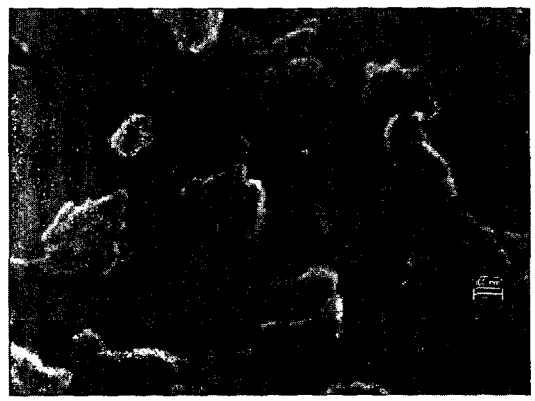
FIGS. 1a to 1e shows some scanning electron microscope images of some pigments in various shapes.

The radiation transmission properties of any given composition of the present invention are altered in their different states by three primary phenomena, the orientation of the pigment particles, the order of the SmA domains in the composition and the birefringence of the composition, as will now be discussed.

Because the pigment particles are chosen to be optically anisotropic, they will absorb radiation differently depending on their orientation. Generally when the light electric vector is aligned with the pigment optical transition moment the light will be absorbed and when the electric vector is orthogonal to it then the light will either not be absorbed or will do so to a lesser extent than when they are aligned since perfect alignment is not very probable. In the visible spectrum, this means that they will absorb radiation to a lesser extent in the latter case than in the former case and appear colourless or only weakly coloured, whereas in the former case, the pigment will absorb radiation more strongly and will appear more strongly coloured in reflection. In other words, the pigments are dichroic.

Pigments are dielectrically anisotropic, that is to say, when placed in an electric field, dipoles will be induced in the pigments so the pigments will be orientated by the same field that orientates the SmA LCs. The typical case is for the pigments to align themselves with the field applied by the electrodes in the first (more ordered) state of the composition. Also the pigments will be subject to the same in-plane fields generated by the migration of the dopants as the LCs (see above discussion), causing electro-hydrodynamic instability in the pigment particles. Thus, when the SmA LCs are disordered by the application of low frequency (or dc) fields, the pigments are disordered as well. In addition to reorientation of the pigments by the field and the disordering caused by migrating dopant, the orientation of the pigments will also be affected by the orientation of the LCs surrounding them since they will tend to align themselves with the LCs. This latter effect on its own is possibly less critical than is the case with dyes since the pigments are much larger than dye molecules and will generally extend over several layers in the SmA structure, whereas dyes will typically be present in one SmA layer.

The second factor affecting the transmission of radiation through the SmA composition is the degree of order in the composition and the number of SmA domains in the composition. Individual domains will determine the transmission of radiation through it. If the composition is in the first state with one, or relatively few, large domains, transmission through the composition as a whole will be relatively uniform, whereas if the composition is fragmented into a larger number of smaller domains, the transmission will be less uniform. The difference in the degree of scattering of radiation between the first, relatively ordered state and the second relatively less ordered state will depend on the birefringence of the composition which is discussed below and is the third factor mentioned above.

Compositions with a high birefringence $\Delta n$ (defined as $\Delta n = n_e - n_o$ where $n_e$ and $n_o$ are the extraordinary and ordinary refractive indices respectively) will scatter light more efficiently than a composition with a low birefringence. Light scattering depends upon both the refractive index anisotropy of the material and the size of the micro-structures developed in the scattering (second, disordered) state. Thus if the birefringence of the composition is high, e.g. in the range 0.15 to 0.4 at 20° C. and 589 nm, the differently orientated domains in a relatively disordered state will direct light in different directions and at large diffraction angles and so the radiation will be scattered and the composition will appear opaque; in contrast, when in the first, ordered state, the large domains or the mono-domain will bend incident radiation through a consistent angle across the extent of the composition and so will not scatter the radiation in different directions and the composition can be optically clear. On the other hand, if the birefringence is low, e.g. in the range 0.07 to 0.15, e.g. 0.08 to 0.13, at 20° C. and 589 nm, the composition will bend an incident beam of radiation through a smaller angle on passing through the composition and the difference between the scattering of a beam of radiation in the ordered state and a disordered state will be smaller and the composition may be translucent in the disordered state and clear in the ordered state.

The composition of the present invention will therefore have the following optical properties. In the first, homeotropic state, the smectic A liquid crystals and the pigment particles will generally be aligned with the direction of the field. This is generally the same direction as the passage of a beam of radiation. Because the pigment particles are oriented in line with the direction of the radiation beam, its absorption of the radiation will be relatively low. Therefore, the composition will transmit the beam and a relatively small amount of the radiation will be absorbed, i.e. in the case of visible light, the radiation will be uncoloured or relatively weakly coloured. Typically, in the homeotropic state the composition will be clear to visible light so that, for example, an image placed behind the composition will be visible and discernable. When a low frequency (or DC) electric field is imposed across a composition, the migration of the dopant will disrupt the alignment both of the smectic A liquid crystals and of the pigment particles. The disordering of the SmA structure breaks the LC composition into smaller domains, each scattering light according to its own orientation, and will cause the radiation beam passing through the composition to be scattered and this effect is especially pronounced when the composition has a high birefringence. At the same time, because the pigment particles are no longer oriented in the same direction as the radiation beam, the pigment particles will absorb radiation which, in the case of a visible light, will make the composition more strongly coloured.

A similar situation prevails when the composition is in a disordered state and the birefringence is low except that the scattering by the composition will be substantially reduced; however, the increased radiation absorption by the pigment particles will remain the same.

As mentioned above, one problem of including small particles such as pigments within a liquid crystal composition is that they tend to aggregate together. This aggregation is addressed in accordance with the present invention by two factors. Firstly, the hydrodynamic change in orientation of the pigment particles as a result of the above-described switching between ordered and disordered states "churns" the composition up and disrupts the aggregation. Secondly, SmA compositions are highly viscous compared with nematic LCs (NLCs). According to Chmielewski and Lepakiewicz [ref 10)] the apparent flow viscosity of 8CB in the nematic phase ranges is between 20 and 35 mPa·s from 40 to 33° C. and in the SmA phase it varies from 500 up to 4500 mPa·s between 32.5 and 21° C. (ref 10). We have found that pigment particles, particularly with size >0.5 μm (micrometer), do aggregate quickly in NLCs but are perfectly stable for long periods when dispersed in SmA LCs.

The composition of the present invention will now be described; it includes the following components (all percentage values in this specification are given by weight % unless stated otherwise):

(A) Mesogenic Liquid Crystal Composition having a Smectic A Structure

Any liquid crystal material having a SmA structure may be used; the term "material" includes a composition made up of a mixture of LCs, some of which need not have a SmA structure by themselves, and additives; suitable SmA liquid crystals are set out in the standard texts.

One smectic A liquid crystal that can be used is 8CB (4-cyano-4'-octylbiphenyl):

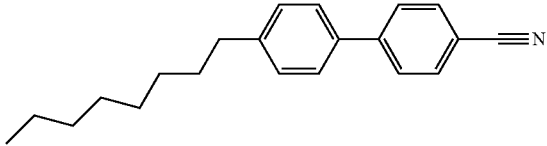 [SMILES: CCCCCCCCc1ccc(-c2ccc(C#N)cc2)cc1]

and its alkoxy variant (8OCB-4-cyano-4'-octyloxybiphenyl) and a mixture of the two. For 8CB the SmA phase exists between 21° C. and 32.5° C. However, it may be desirable to use a compound that forms an SmA structure over a wider temperature range before it converts to other phases, such as nematic or isotropic. Some years ago Merck developed a series of SmA mixtures S1, S2 . . . etc. using higher homologues of these materials to achieve this.

Another family of SmA liquid crystals that may be used have an alkyl chain having at one end a polar group making the molecule dielectrically anisotropic and having a siloxane chain at the other that drives the formation of the liquid crystals into layers and constrains the material to adopt a SmA structure as a result of the attraction of the siloxane chains to each other, for example as disclosed in WO 2010/070606. Optionally a mixture of siloxane augmented LCs and non-siloxane LCs may be used.

The amount of the liquid crystal composition having a SmA structure in the overall composition may be 50-98%.

All percentage values in this specification are given by weight % unless stated otherwise.

(B) Dopant

As discussed in the prior art section, Smectic A phases have a positive dielectric anisotropy and an ionic dopant is added to disrupt the layer structure of SmA liquid crystal as the dopant migrates through the composition under the influence of certain electric fields (generally low frequency or non-alternating fields) applied across the liquid crystal composition. Order in the composition can be restored by applying a higher frequency field that does not allow the dopant to migrate significantly and yet causes the mesogens to align with each other.

The electro-hydrodynamic instability of the liquid crystals necessary to bring about dynamic scattering as a result of the dopant migration under an applied field in the above case can only occur if the conductivity anisotropy of the composition is negative, i.e. the migration direction of the dopant ions is in the plane of the smectic layers and orthogonal to the direction of the applied electric field.

Three issues dominate the choice of the ionic dopants:

i) The ability of the ions to disrupt the layer structure of SmA liquid crystal. Ions with long linear hydrocarbon chains somewhat similar in shape to those of the liquid crystal molecules are found to be most suitable. Non-linear ions exhibit conductivity anisotropy, but do not cause dynamic scattering in the liquid crystal host or the pigment particles. It is usually but not necessarily the cation (the positive ion) that causes scattering and quaternary ammonium compounds with at least one long aliphatic hydrocarbon chain attached to the nitrogen atom are suitable for this purpose in the context of the present invention; Crossland et al 1976 (P1) have already proposed the use of quaternary ammonium compounds as ionic dopants, as has a detailed study carried out with halide counter ions in 1987 (Coates, Davey et al ref 4). The ionic compounds are of the form:

where $R_1$, $R_2$, $R_3$ or $R_4$ may be alkyl groups, which may be the same or different.

In the present invention, $R_4$ is an alkyl hydrocarbon chain with greater than 8 carbon atoms, preferably 12-18, in order to promote disordering of the mesogens. The nature of the remaining three groups can control the retention of the substituted ammonium ion at surfaces in contact with the composition.

If $R_1$, $R_2$, $R_3$ are H atoms, there is a danger that the absorption of ions at the electrodes (and other surfaces) will deplete their concentration in the bulk. Crossland et al 1976 (P1) disclosed the use of selected hexadecyl tri-methyl ammonium salts with halide counterions. On some surfaces (e.g. relatively rough surfaces of indium-tin oxide films on glass) tri-methyl derivatives might still be absorbed over long periods of time and display operation, in which case $R_2$ and/or $R_3$ might be replaced with $C_2$, $C_3$ or $C_4$ alkyl groups. Within the above stated limits the solubility of such dopants in smectic A hosts is excellent and they show very little tendency to be electro-chemically reduced.

The counterion should be oxidatively stable in a liquid crystal optical device, e.g. in a display having a thickness of 5-15 μm across which is applied a field of 2-20 V/μm.

Crossland et al 1976 and subsequent publications (P1, P2, P3, 1, 2, 3) disclosed the use of bromide ($Br^-$) counter ions i.e. $X^-=Br^-$. Devices made with bromide counter ions usually fail to survive long term device operation (they have a life of few 10,000s of cycles, see, for example, P7).

Perchlorate anions ($ClO_4^-$) have been found to increase the lifetime of SmA displays using quaternary ammonium ionic dopants relative to other possible counter ions (such as bromide). Within an appropriate choice of smectic host they can survive greater than $20\times10^6$ scattering operations, see ref 7 which used perchlorate ions, although this and the switching time of the scattering operation were not reported in the publication for commercial reasons.

The use of quaternary ammonium perchlorates, as the dopant, has been observed to deliver a wide range of conductivity anisotropy in SmA hosts, ranging from close to 1 to greater than 10. These materials have been found to be highly electro-chemically stable and capable of introducing strong scattering in totally organic smectic A phases, e.g. in near eutectic mixtures of alkyl and alkoxy cyano-bi-phenyl mixtures (containing 8CB and 8OCB), and in SmA phases containing siloxane derivatives.

iii) Quaternary ammonium compounds with long hydrocarbon chains are surfactants and adsorb onto glass surfaces with the hydrocarbon chain oriented orthogonal to the surface. As such they align liquid crystals with their director orthogonal to the surface (homeotropic alignment). In SmA scattering displays there is equilibrium between dopant dissolved in the liquid crystal and dopant adsorbed onto the surfaces of the containing cell. This can be controlled by varying the size of the substituents $R_2$, $R_3$ and $R_4$ in order to avoid depletion of the dissolved dopant from the liquid crystal solvent and, on the other hand to promote homeotropic alignment and therefore lower the voltages required to give efficient clearing of light scattering textures. We believe that $R_2$, $R_3$ and $R_4$ need not all have the same length, e.g. $R_2$ may be a $C_2$, $C_3$ or $C_4$ alkyl group and $R_3$ and $R_4$ may be methyl.

In summary, preferred dopants are quaternary ammonium salts, preferably perchlorates, of the form:

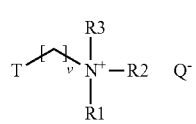

(II)

wherein:
v=1 to 30, for example v=9 to 19, e.g. myristyl (v=13, T=methyl) or cetyl (v=15 and T=methyl),
R1, R2 and R3, which may be the same or different, are $C_{1-4}$ alkyl, e.g. methyl or ethyl, with one or two of them optionally being $C_2$ or greater
T=a methyl group or a silyl or siloxane group
Q=a counterion that is oxidatively stable in a liquid crystal optical device of the present invention, e.g. in a display having a thickness of 5-15 μm across which is applied a field of 2-20 V/μm.

The dopant may be present in an amount of 0.001-1% in total.

(c) Pigment

The optically anisotropic pigment particles are such that their length, i.e. the largest dimension of the pigment particle, is in the range of 10 nm to 1 μm, e.g. 100-200 nm. They are optically and dielectrically positively anisotropic. As used herein the term "pigment" includes materials that can selectively absorb radiation in white visible light at certain wavelengths to provide a colour to the non-absorbed light. However, the term "pigment" used herein is broader than that and includes any material that can absorb radiation at a desired wavelength and so includes materials that can absorb non-visible radiation, for example microwaves, and materials that have a black 'colour' that absorb all radiation at the required wavelengths or a white 'colour' that reflects and scatters radiation rather than absorbing it. The pigments that can be used may be organic or inorganic pigments and include:

1. Azo type organic pigments, i.e. include an azo (—N=N—) link, and may also include a benzimidazolone group, for example:

a)

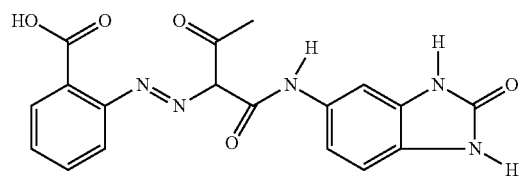

2. Polycyclic type organic pigments, for example diketopyrrolo-pyrrole DPP:

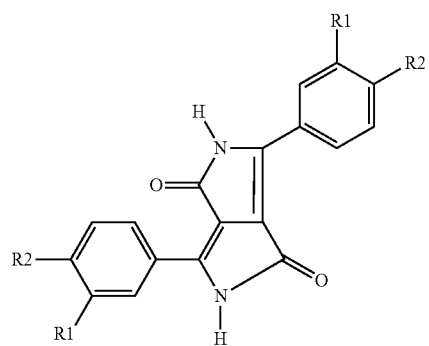

R1 = H or CN
R2 = H, C(CH$_3$)$_3$, Cl, Ph or CH$_3$

3. Chelated transition metals, e.g. Cu phthalocyanine

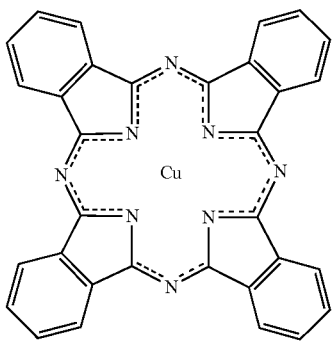

4. Quinacridone

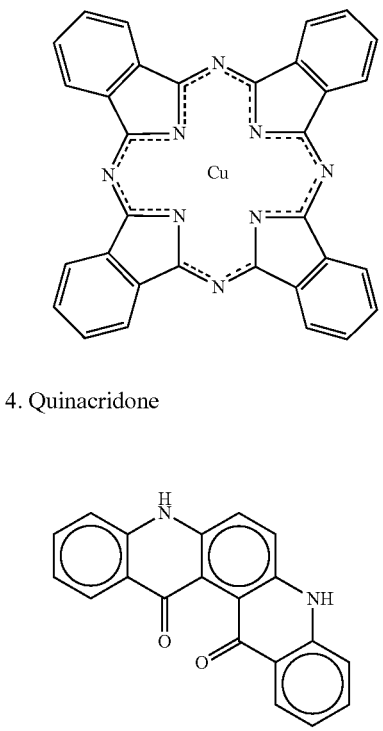

(cis)

5. White inorganic pigments:
   ZnTiO$_4$
   BaTiO$_3$
   TiO$_2$
6. Black inorganic pigments:
   carbon black, e.g. pigment black 7 (from Clariant Services UK Ltd, Clariant House, Unit 2, Rawdon Park, Yeadon, Leeds, LS19 7BA, United Kingdom)
   Flexoprint Black CB 01
   Hostaprint Black L 32 (from Clariant).

The amount of pigment in the composition will generally be less than 10% and typically less than 5%, such as 0.1-3%, although the amount of pigment that can be tolerated in the composition will depend on the size of the particles; excessive pigment loading will increase the possibility of aggregation.

(D) Other Components

The liquid crystal composition can include components other than components (A) to (C) mentioned above. These additional components should be such (and be present in amounts such) that the SmA structure of the overall composition is maintained over as wide a temperature range as possible (generally −20° to ~100° C.). It should be noted that component (A) can be a mixture of LCs and this mixture can include LCs that do not themselves have a SmA structure. These additional LCs can be chosen to provide some or all of the properties set out below and they should be counted in the amount of component (A) and not the amount of additive component (D), which is not necessarily LC. The following additional components may be mentioned as examples of component (D):

(i) viscosity adjusting components, such as thickeners and diluents.

The above discussion shows that the viscosity of the composition has a beneficial effect (in combination with the hydrodynamic mixing of the composition caused by the migration of the dopant) preventing agglomeration of the pigment particles. However, on a practical commercial scale, the viscosity should not be so high that it is difficult to fill the space between electrodes in cells with the composition, although the filling could be done at an elevated temperature to reduce the viscosity.

(ii) Birefringence-altering additive

The composition can include at least one birefringence-altering additive in an amount up to 50% by weight, e.g. up to 35 or 40%, in total of the whole composition to tailor the amount of scattering in the second, disordered forms. These materials may include birefringence increasing additives, for example:

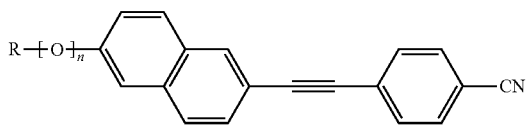

where R=$C_{1-10}$ alkyl, n=0 or 1,

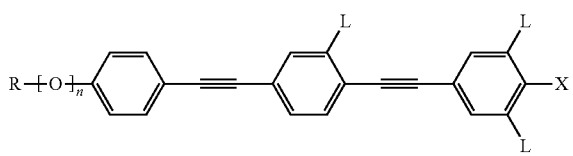

where R=$C_{1-10}$ alkyl, n=0 or 1, L is selected from hydrogen, or $C_{1-3}$ alkyl and X=CN, F, NCS, $CF_3$, $OCF_3$ or $C_{1-6}$ alkyl or

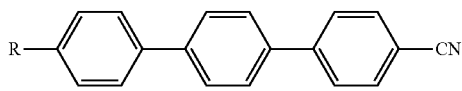

where R is a $C_{1-10}$ alkyl group, or birefringence lowering additives, for example:

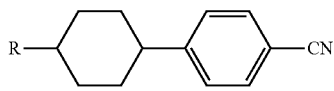

where R=a $C_{1-10}$ alkyl group.

or

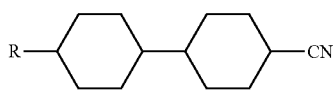

where R=a $C_{1-10}$ alkyl group

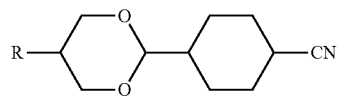

where R=a $C_{1-10}$ alkyl group (iii) polymers to stabilise structures and help prevent agglomeration of pigment particles. This can also assist thickness control and possibly improve electro-optic performance and bistability as well as temperature stability. The introduction of a polymer network also is a means of preventing pigment particles being plated out on electrodes due to the electrophoretic effect. For plastic substrates it will improve cell stability and adhesion between substrates. These can be incorporated in the composition and polymerised in situ. The polymers, which are used in the previous illustrations, are well known in the field of liquid crystals particularly for use in polymer dispersed liquid crystal displays (PDLCs).

In one embodiment, the liquid crystal composition of the present invention may be the general and specific compositions disclosed in WO/2011/115976 to which component (C), the pigment particles, is added and the contents of WO/2011/115976 are incorporated by reference herein.

Displays Containing the Composition

The composition has particular application in displays and the features of the prior art cells and displays, as discussed above, are applicable to contain the composition of the present invention. The overall composition may need to be modified to meet the particular requirements of the specific electronic drive circuits used to address the display in the chosen display configurations, in particular, the balance between clearing and scattering, the relative response times and the display lifetimes all depend on this formulation.

Pixellation is an issue for true colour rendition in reflective displays. In a conventional liquid crystal display for video applications, the small picture elements (pixels) are back-illuminated with very bright lights and each pixel is made up of three or four subpixels, one for each primary colour and one for black.

If one were to try a similar approach in a reflective colour display with a white background, then the colour would be washed out as every subpixel switches between colour and white, so spatially separated colour subpixels can only result in heavily de-saturated colours. For a reflective display the need is to use subtractive colour mixing at each pixel so that the additive effect of all the subpixels is to provide a good colour rendering of the image with close adherence to colour maps achievable in modest print quality.

This may be achieved in accordance with the present invention, by stacking at least three cells to form a pixel, in which cells are individually switchable in colour density in the primary subtractive colours (cyan (red absorbed), magenta (green absorbed) and yellow (blue absorbed)). However, to be viable this requires that, in the summation of coloured layers of the stack, the liquid crystal elements in the stack are able to switch between a clear state and a coloured state that has a reduced level of scattering and preferably minimal scattering (otherwise light will be forward- and back-scattered away from normal before reaching the lower coloured layers in the stack). The intention is that light passes through one partially coloured subtracting layer, and then through another (etceteras), until impinging on the white reflector and passing back through the stack, creating a full colour gamut at the pixel. The scattering in the first two coloured layers may be reduced by decreasing the thickness of liquid crystal layers and (in terms of the liquid formulation) reducing the liquid crystal birefringence as already discussed (see also Crossland et al in reference P6).

The birefringence can be tailored by a suitable choice of the components of the composition to reduce the scattering in the disordered state so that the material remains translucent in the partially scattered state and allows underlying colour to be mixed with the transmitted beam via subtractive colour mixing. To allow the colouration to work, the stack may use complementary colours, which can provide access to a full colour gamut. Addition of black (K) is desirable in certain applications; the colouration using pigments may be done in combination with coloured back-planes, and other practices known to those skilled in the art, to yield a coloured reflective display or, alternatively, a lit display to provide the performance required in diverse applications. For example, the standard complementary colours cyan, magenta and yellow layers may be used, optionally with a black layer, and provide good brightness, especially since polarisers are not necessary.

As mentioned above, the viscosity of the composition is important when filling it into large area devices such as glass panels. In addition, the surface energy of the composition must be controlled accurately, e.g. using surfactants, to match that of the electrodes (or other layer defining the LC aperture in the device). It is essential that the composition can flow into the aperture and not separate (into its constituent parts) during the filling and spreading out across the full area.

Figure 4:
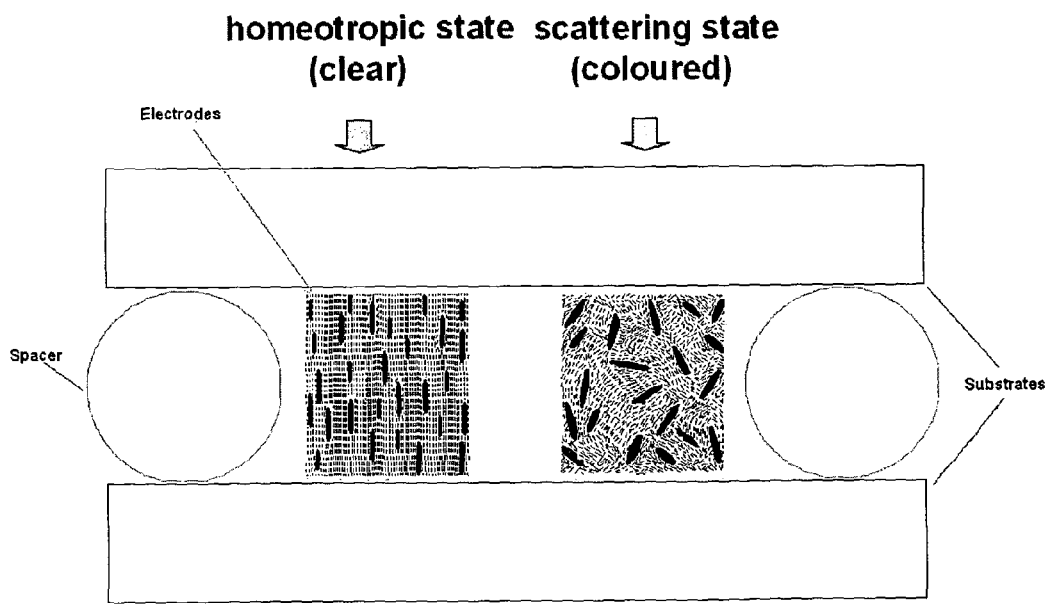
FIG. 4 is a schematic depiction of a coloured display type of device according to the present invention filled with pigment/SmA liquid crystal suspensions.

A schematic cell is shown in FIG. 4. Spacer beads or fibres separate a pair of glass or plastic substrates and define the cell thickness. An edge seal is used to retain the liquid crystal composition in the cell. The liquid crystal electro-optic devices of the present invention typically have a cell gap designed to be in the range of 0.5 microns to 20 microns. A transparent conductor layer, e.g. indium tin oxide, is applied to each of the substrates to form electrodes. The lower substrate may be reflective or may emit light in a back-lit display. The device is intended to be observed through one of the transparent substrates and electrodes.

Refs 5 and P5 also give details of displays that can be used in the context of the present invention.

Range of the Components in the Composition of the Present Invention

The broad range of the amounts of these components in wt % are set out in the claims and in the table below; the table additionally sets out narrower ranges; the limits of each range for any of the components can be combined with the limits of any other range for the same component and the ranges of any component in the composition set out below are independent of the amounts of the other components,

| Component | | Broad range | Narrower range 1 | Narrower range 2 |
|---|---|---|---|---|
| LC or a mixture of LCs providing SmA structure | (A) | 30-99% | 40-90% | 50-70% |
| Dopant | (B) | 0.001-10% | 0.01-2% | 0.03-0.5% |
| Pigment | (C) | 0.1-10% | 0.5-6% | 0.1-2% |
| Viscosity adjusting additive | (D)(i) | 0-10% | 0-8% | 1-5% |
| birefringence-altering additive | (D)(ii) | 0-50% | 5-40% | 10-30% |
| Polymer additive | (D)(iii) | 0-30% | 1-20% | 2-15% |

The manufacture of the compounds used to make the composition of the present invention is well-known in the literature of the liquid crystal art. For example:

Hosts (component (A)): Organic liquid crystals or Oligosiloxanes. Organic liquid crystals and liquid crystal compositions are commercially available. A basic synthesis of oligosiloxanes is given for example materials in the literature (ref 10).

Ionic dopants (component (B): are commercially available

Pigments (component (C): these are commercially available, although their particle size may need to be reduced, which may be done using the method described in the examples.

Likewise the arrangement of the electrodes and the electrical circuits necessary to drive a display containing the composition of the present invention are the same as those well known in the field of displays and it is not necessary to give further detail here.

FIGS. 1a to 1e shows some scanning electron microscope images of some pigments in various shapes:

FIG. 1a: Hostaperm 8G (green 36), having a rod like shape (large aspect ratio)

Figure 1B:
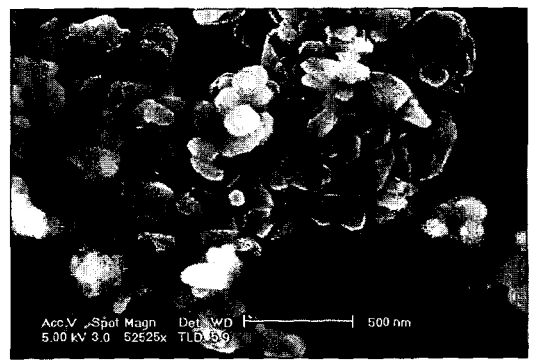
Figure 1C:
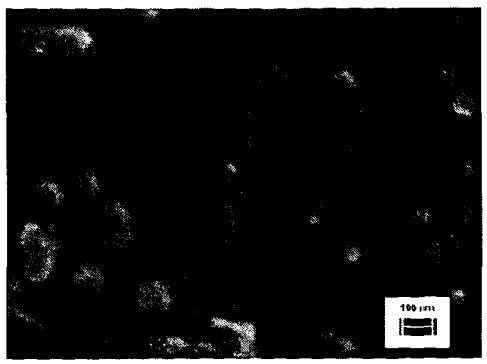
Figure 1D:
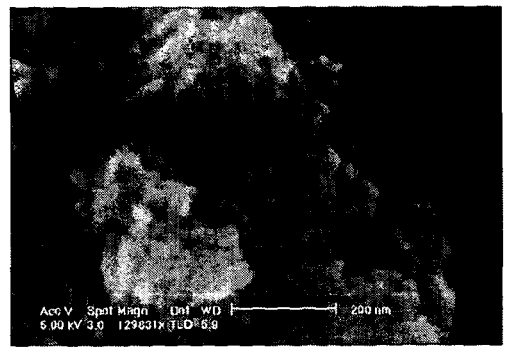

FIG. 1b: PV fast D3G (red 254) having rod like particles but with a small aspect ratio FIG. 1c-d: PV fast A2R (blue 15:1) PV fast E3B (violet 19)

Figure 1E:

FIG. 1e: PV fast E3B (violet 19)

Example 1

The following table shows the physical properties of some organic pigments that can be used in the composition of the present invention:

| Catalogue Number | Colour index | Aspect Ratio (L/W) | Shape average primary particle size (nm) | Light-fastness Weather-fastness | Chemical Structure |
|---|---|---|---|---|---|
| PV fast D3G | Red 254 | 1.8 | Rod 182 nm | 8 5 | Diketopyrrolo-pyrrole (DPP) |
| PV fast E3B | Violet 19 | 1.8 | Rod (widely distributed) 189 nm | 8 4-5 | Quinacridone |
| PV fast GNX | Green 7 | 1.4 | short rod 50 nm | 8 5 | Cu Phthalocyanine |
| Hostaperm 8G | Green 36 | 3.3 | Rod 35 nm | 8 5 | Cu Phthalocyanine |
| PV fast A2R | Blue 15:1 | 1.3 | short rod 40 nm | 8 5 | Cu Phthalocyanine, α-Mod. |
| Hostaperm B4G | Blue 15:3 | 1.6 | short rod 85 nm | 8 5 | Cu Phthalocyanine, β-Mod |
| PV fast H2G | Yellow 120 | | Size 130 nm | 8 4-5 | Benzimidazolone |

Two LC base compositions (Component A)) were made from:
1. Organic SmA liquid crystal mixtures
   8CB/10CB/80CB mixture
   S1023X (Merck ltd)
   or
2. Organic SmA mixture S5a (Merck Ltd)

In both cases hexadecyl trimethyl ammonium perchlorate was used as ionic dopant.

The organic pigment samples (component (C)) were selected in terms of high light and weather fastness, relatively small primary particle size and variety of colours (red, green, blue, violet, yellow). The basic chemical structures of the chosen pigments fall in the following four categories: 1) Diketopyrrolopyrrole (DPP); 2) Cu Phthalocyanine; 3) Quinacridone; 4) Benzimidazolone. These pigments possess excellent light fastness (typically 8) and weather fastness (typically 4-5). The average primary particle sizes span from 35 to 189 nm. The shapes of the pigments (seen in SEM images—see FIG. 1) are mostly rod-like with various aspect ratios (length/width) indicated in the table as above.

The inorganic pigments are either white or black in colour. The light fastness of the inorganic pigments is generally excellent (typically 8).

The presence of over-sized particles can significantly impair the performance of the final pigment/liquid crystal suspension. Reducing the particle size is therefore essential for producing well-dispersed particle/host systems. It was found some pigments can be fractured by sonicating, but some can only be broken up using a ball mill. Also the type and the ratio of the surfactants and solvents used vary depending on the specific pigment.

Figure 2:
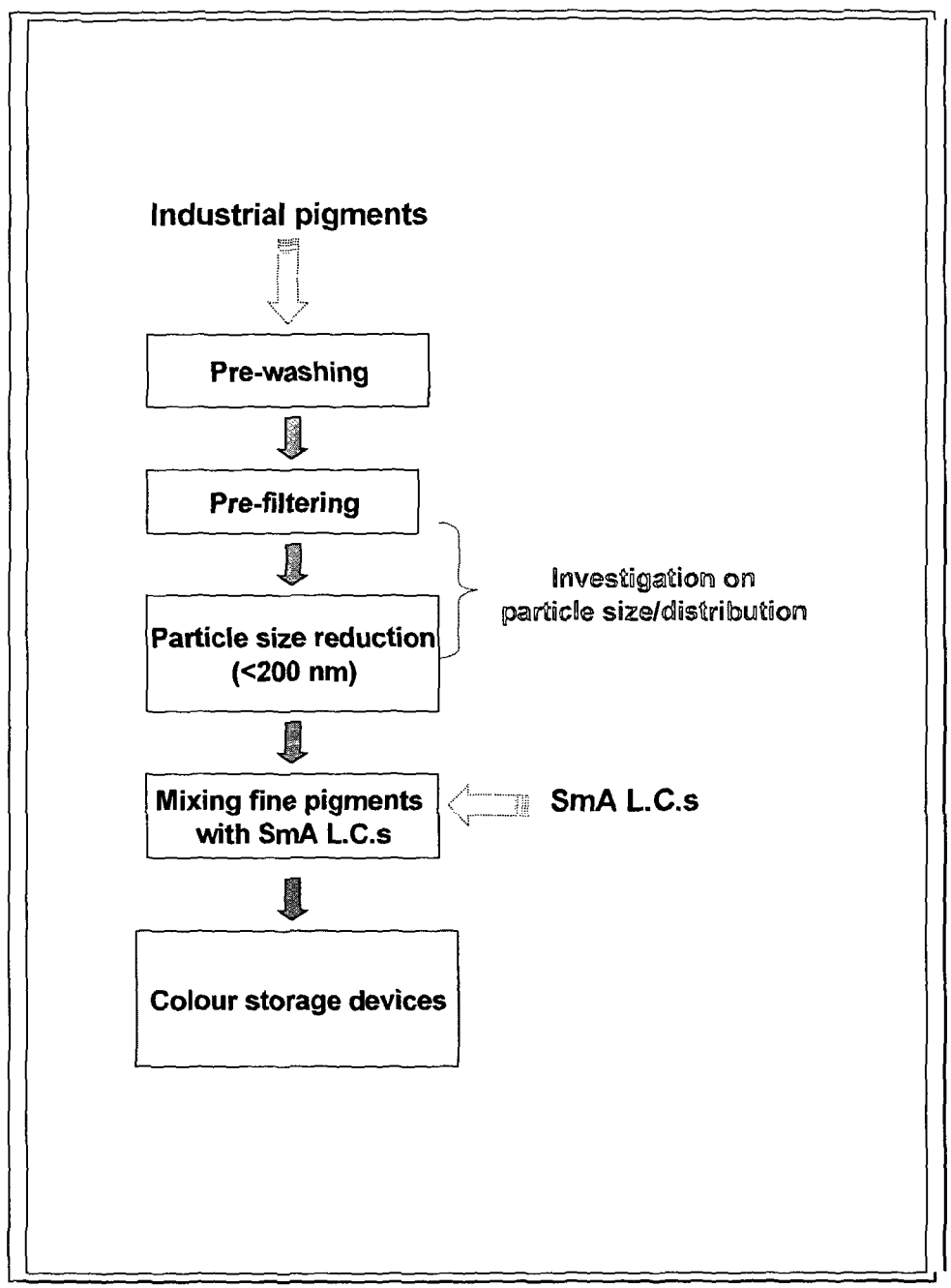
FIG. 2 is a flow diagram of a process for making a fine sized (100-200 nm) pigment/liquid crystal suspension.
Figure 3:
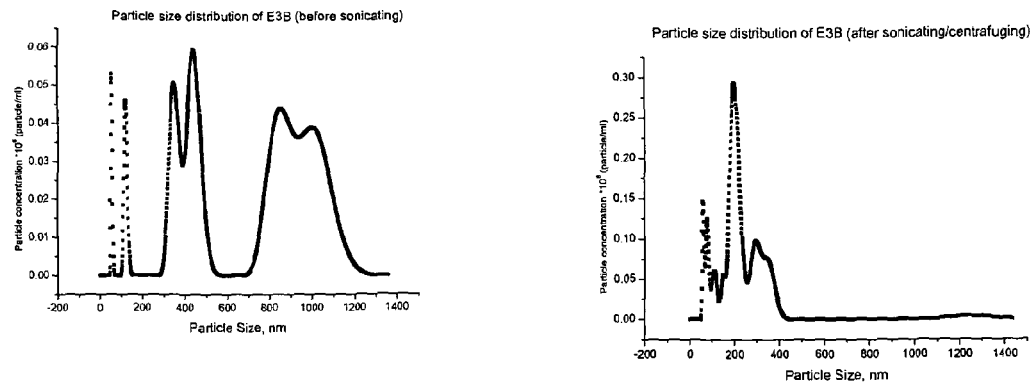
FIG. 3 shows plots of the size/distribution of a pigment (E3B violet) before (left) and after (right) sonicating treatment

An exemplary process for making fine sized (100-200 nm) pigment/liquid crystal suspension is set out in FIG. 2 This involves the following steps:

1. Pre-washing pigments by solvents (e.g. methanol, ethanol or IPA);
2. Pre-filtering pigment/solvent mixtures. For organic pigments, the initial sizes were limited to below 1 μm.
3. Investigating the particle shape/size/size distribution of each selected pigment by SEM (scanning electric microscope) and a light scattering method (Nano Sight LM10 Nano particle Analysis System).
4. Reducing the sizes of pigment particles by a sonicating method using the following equipment:
   Sonicator [SONIFIER 450, Branson]
   TS Centrifuge [WX Ultra 100, Thermo Scientific]
   Nano Sight LM10 Nano particle Analysis System & NTA 1.5 Analytical Software (NanoSight Ltd)
   and the following materials as surfactants and solvents:
   Surfactants: SOLSPERSEs series (Lubrizol)
   Solvents: methanol, ethanol, IPA or acetone
   Alternatively the reduction in the sizes of pigment particles was performed by ball milling using a model 12 Ball Mill (Pascal engineering Co Ltd, UK) with 0.6-0.8 mm radius zirconium silicate grinding balls (Dynamic Ceramic Ltd) and the following surfactants and solvents:
   Surfactants: SOLSPERSEs series (Lubrizol)
   Solvents: methanol, ethanol, IPA or acetone
   FIG. 3 shows plots of the size/distribution of a pigment (E3B violet) before (left) and after (right) sonicating treatment.
5. Mixing the pigment/surfactant/solvent suspensions with LC/dopant hosts and then evaporating the solvents from the final mixtures.

The SmA compositions are made by mixing one or other of the LC base compositions (1) or (2) with the pigment/surfactant/solvent suspensions. After solvents are evaporated, the compositions are then filled into cells that are shown in FIG. 4. The figure shows schematically the composition in two blocks, one depicting the first, ordered (homeotropic) state, which is optically clear and colourless or only lightly coloured because the pigment particles are aligned with the LCs at right angles to the electrodes. The second shows the disordered, scattering state, which is opaque and coloured because the SmA liquid crystals are broken up into domains and because the pigment particles are randomly orientated, including lying transverse to the direction between the electrodes. In reality the SmA composition does not occupy blocks but fills the whole of the space between the top and bottom substrates and between the left and right spacers.

Figure 5:
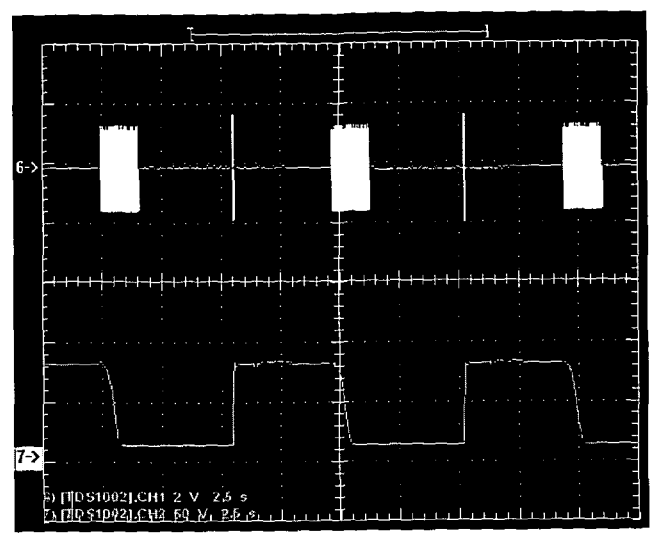
FIG. 5 shows the electro-optic responses of a single pixel device according to the present invention filled with a pigment 3% E3B (violet)/LC mixture, which switches between two stable states. The upper plot shows the applied square wave pulses with low frequency (50 Hz, long pulses) and high frequency (4 kHz, short pulses); b) the lower plot shows the optic transmittance change under the applied electric field.

When an electric field at high frequency (>1 kHz) is applied across the LC material layer by the electrodes, the pigment particles (with their optical axes aligned with the LC directors) will become oriented together with the LC matrix in the direction orthogonal to the electrodes, which is also the direction of viewing. Both the LCs and the pigments will become orientated in this way due to their dipolar interactions with the field. This state is shown in the left hand block in FIG. 4. Owing to the anisotropic absorption of the pigment particles and their re-orientation with the electric field, the device filled with the pigment/SmA liquid crystal suspension exhibits a transparent homeotropic state. In contrast at low frequencies (<100 Hz), the dopant migrating through the SmA composition layer scatters the LCs and the pigment particles and breaks the SmA from the homeotropic state to the scattering state depicted in the right hand block in FIG. 4, which is a coloured state due to the orientation of the various pigment particles in directions that are not all orthogonal to the electrodes FIG. 5 shows the electro-optic responses of a single pixel device filled with a pigment 3% E3B (violet)/LC mixture), which switches between two stable states. The upper plot shows applied square wave pulses with low frequency (50 Hz, long pulses) and high frequency (4 kHz, short pulses); b) the lower plot shows the resulting optic transmittance change under the applied electric field. As can be seen, the application of the low frequency long pulses of electric field reduces the transmittance of the composition since it allows the dopant to disorder the LCs and the pigments so that the composition is opaque and coloured whereas the high frequency short pulses cause the LCs and the pigments to become aligned with the field gradient, causing the transmittance to increase. It should be noted that the transmittance remains constant between the pulses (when no electric field is applied) because the composition possesses bi- or multi-stability. Because of the electro-optic storage nature of the SmA liquid crystals, the transparent and the coloured states can last for years under zero electric field (i.e. under no applied power). Such devices could be used as SmA liquid crystal displays in outdoor locations, where the pigments do not degrade as quickly as dyes.

Example 2

UV Life Tests for Pigment/SmA Mixtures

Various pigments as detailed below were incorporated in base composition 1 of Example 1 and tested for deterioration in their colour over a test time of 1000 hours in a UV test chamber (INVE 96) containing a UV medium pressure lamp-Zp type Based on the UV lamp and sun light spectrum, an aging factor was estimated according to the power ratio of the UV lamp rays against sun light. It was found that 1000 hours of UV lamp radiation is equivalent to about ~7 years of solar exposure (at sea level) the calculations of equivalent years of exposure to sunlight do not take into account seasonal changes and changes to the incident angle variation of the sunlight.

5 pigment compositions were made, each containing a total of 3% of one of 5 pigments (8G green, A2R blue, D3G red, E3B violet, P-BFS01 blue) in base composition 1 of Example 1 and almost no colour decay was found in any of the pigment compositions after being exposed to UV in the test chamber for 1000 hours.

In contrast the same base composition using a dye as opposed to pigment particles were tested. For dye AB4-blue in the base composition, reflectivity at 450 nm was rapidly reduced by 15.69% points between exposure after 336 hours and exposure after 504 hours exposure in the. After 1000 hours, the total reduction of reflectivity (ΔR %) was 40.7% as compared to the reflectivity before exposure.

For dye AR2 (red) in the base composition, a clear reduction of reflectivity ΔR (%) was found as compared to the composition before UV exposure and was reduced by 28.56% points at 620 nm between exposure after 336 hours and exposure after 504 hours. After 1000 hours, the total reduction ΔR % was 49.86% as compared to the reflectivity before exposure.

Thus an evident decay of the dye colours appears after the equivalent of 2~3 years of exposure to sunlight, even though those dyes are recommended as having good light fastness. In contrast the compositions containing the pigments lasted the equivalent of at least 7 years exposure to sunlight.

Example 3

Switching Life Tests for Pigment/SmA Mixtures

Various pigments as detailed below were incorporated in base composition 1 of Example 1 in an amount of 3% and tested for the number of switching cycles (clear to opaque to clear) before failure. The results so far for relatively large single pixel cells (typically 10 mm by 10 mm in size) were as follows:

| Composition | Lifetime |
| --- | --- |
| (8G) green/SmA | ~2.6 million times |
| (BFS-01) blue/SmA | ~2.9 million times |
| (D3G) red/SmA | ~1.9 million times |

Significant improvement in lifetime and colour uniformity is expected in multi-pixilated configuration with small pixel sizes (in the order of 1 mm by 1 mm or less).

Therefore the devices of the present invention have a lifetime equivalent to at least 7 years exposure to sunlight and can survive an average number to switching operations of at least 2~3 million times.

In summary, the main features of an optical device in accordance with the present invention are:
a) they are capable of bi- and multi-stability that is suitable for storage displays;
b) they can form coloured devices with a long lifetime (compared with dyes) under UV exposure, ideal for use in outdoor applications;
c) they are of simple construction since they do not require polarizers or alignment layers;
d) they have a low power consumption, because stored optical states exist at zero power.
e) SmA liquid crystal compositions with a relatively high viscosity (compared to that of nematic liquid crystals) are ideal host materials to stabilise the pigment particles.
f) smectic dynamic scattering (SDS) caused by the migration of the dopant under the influence of a low frequency ac field and the resulting realignment of liquid crystals and the pigment particles keeps the pigments in a dispersed state and discourages them from aggregating together.

The electro-optic performances of pigment/LC cells were found to be slightly different from that of the pure LC cells. First, the transmittance value of a pigment/LC cell is generally lower. This is partially due to the remaining oversized particles plating out on the windows of the substrates. Also the order parameter of the liquid crystal matrix is reduced by the presence of the large pigment particles (100~200 nm long), which passes through many smectic layers (typically 3-4 nm in thickness). In order to prevent pigments from being attracted to the electrodes by the electrophoretic effect, preferably no DC or low frequency (<10 Hz) voltages should be applied across such devices.

REFERENCES (THE CONTENTS OF WHICH ARE INCORPORATED BY REFERENCE

1. A. Crossland, D. Coates, J. H. Morrissey, B. Needham Annales 'Electrically Induced Scattering Textures in Smectic A Phases and their Electrical Reversal', de Physique, Vol. 3, No. 2-4, pp 325. 1978.
2. D. Coates, W. A. Crossland, J. H. Morrissey, B. Needham 'Electrically Induced Scattering Textures in Smectic A Phases and their Electrical Reversal', J. Phys. D (Applied Phys), Vol. 11, p 1, 1978.
3. W. A Crossland, P. J. Ayliffe, 'An evaluation of smectic dynamic scattering for high complexity displays with on-screen memory', Proc. SID, 23, (1), 1982.
4. D. Coates, A B Davey and C. J. Walker, 'Dielectric and Conductivity Studies of Smectic A Materials towards improved Dynamic Scattering Display Characteristics', Proceedings of Eurodisplay, pp 96-99, 1987.
5. W. A. Crossland, S. Cantor, 'A novel approach to flat screen displays: An electrically addressed smectic storage device', Proc. SID Int. Symp, Orlando Fla., Digest of Technical Papers, 124-127, 1985.
   W. A. Crossland, S. Cantor, 'Electrically addressed Smectic storage device for large flat panel displays', Electrical communications, 60, (1), 87-93, 1986.
   W. A. Crossland, S. Cantor, 'Large panel displays using smectic memory LCDs', Electrical engineering 35, August 1985.
6. D. Coates, W. A. Crossland, J. H. Morrissey, B. Needham, 'A variable tilt SmA electro-optic effect giving stored colours', Mol. Cryst & Liq. Cryst., Vol. 41 (Letters), pp 151-154, 1978
7. A. B. Davey, W. A. Crossland, and G. Sun "Dyed Smectic A Liquid Crystals for Colour Reflective Displays", Proc. Latindisplay 2007, pp 107-111, November 2007.
8. J. A. Geurst and W. J. A. Goosens, Phys. Lett., 41a, 369, 1972
9. P G de Gennes, 'The Physics of Liquid Crystals', 1974. Chigrinov, 'Liquid Crystal Devices', Artech House, 1999.
10. A. G. Chmielewski and E. Lepakiewicz, 'Reological properties of some biphenyl liquid crystals', Rheol Acta, vol. 23, 207-210, 1984.

REFERENCE LIST OF PATENTS (THE CONTENTS OF WHICH ARE INCORPORATED BY REFERENCE)

P1 'Method for Preparing and Operating a Smectic Liquid Crystal display Cell having Infinite Storage Properties', W. A. Crossland et al., U.S. Pat. No. 4,139,273, filed 1976
P2 'Co-ordinate Addressing of Smectic Display cells', W. A. Crossland et al., U.S. Pat. No. 4,419,664, filed 1980
P3 'Addressing Smectic Displays', P. J. Ayliffe, U.S. Pat. No. 4,703,304, filed 1985
P4 'Liquid crystal Display Incorporating Positive and Negative Smectic Material', W. A. Crossland, J. H. Morrissey, D. Coates, U.S. Pat. No. 4,291,948, filed 1978
P5 'Smectic A Colour Displays', W A Crossland, A B Davey, Gang Sun, C Dixon, PCT/GB 2005/003705 (WO 2006/035213 A2, Priority Date 28 Sep. 2004
P6 WO2006/035213 (Crossland et al)
P7 'Liquid Crystal Dopants', Netland, K. et al., EP 1 537 190 B1
P8 Klein S. and Geisow A. D. (H.P. development company, US), 'Liquid crystal display device', WO/2006/003171, International filing date: Jun. 30, 2005.

The invention claimed is:

1. A liquid crystal smectic A composition that can be switched by the application of different electric fields across it between a first stable state and at least one second stable state in which the composition is less ordered than in the first state, the radiation transmission properties of the first and second states being different at at least one wavelength, the composition comprising:
   (A) a liquid crystal material that has a positive dielectric anisotropy and that is a uniformly aligned smectic A structure when in the first state;
   (B) an ionic dopant giving a negative conductivity anisotropy in the liquid crystal smectic A composition so that it is capable of disrupting the smectic A structure of the first state when subject to an electric field that causes the dopant to migrate through the composition, thereby causing the composition to switch into the at least one second state, and
   (C) optically anisotropic pigment particles having positive dielectric anisotropy dispersed in the composition, the largest dimension of the pigment particles being in the range of 10 nm to 1 μm
   wherein the composition, when in the first state, is capable of undergoing smectic dynamic scattering due to electro-hydrodynamic instability under the influence of a sufficiently low frequency AC field, thereby disordering the liquid crystals and the pigment particles and thereby discouraging the pigment particles from aggregating together.

2. A liquid crystal smectic A composition as claimed in claim 1, wherein the composition, when in the at least one second state is capable, under the influence of a sufficiently high frequency AC field, of ordering the liquid crystals and the pigment particles.

3. A liquid crystal smectic A composition as claimed in claim 1, wherein the disordering of the liquid crystals and the pigment particles comprises rearranging the liquid crystals and the pigment particles.

4. A liquid crystal smectic A composition as claimed in claim 1, wherein liquid crystal material (A) comprises an organic smectic A liquid crystal or an inorganic smectic A liquid crystal.

5. A liquid crystal smectic A composition as claimed in claim 1, wherein component (B) comprises at least one quaternary ammonium salt of the general formula VI:

(VI)

wherein:
   T=a methyl group or a silyl or siloxane group,
   v=1 to 30,
   R1, R2 and R3, which may be the same or different, are $C_{1-4}$ alkyl,
   Q⁻ is an oxidatively stable ion.

6. A smectic A composition as claimed in claim 5, wherein the at least one quaternary ammonium salt of formula VI is a compound of the formula (VIa):

(VIa)

where v, R1, R2, R3 and Q are as defined above; or a compound of the formula VIb:

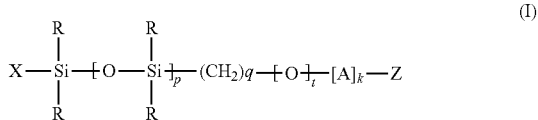
(VIb)

wherein v, R1, R2, R3 and Q are as defined above and T' is a silyl or siloxane group.

7. A smectic A composition as claimed in claim 1, wherein component (A) comprises:
   (a) at least one siloxane of the general formula I:

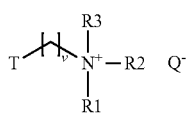

$$X-\underset{R}{\overset{R}{Si}}-\left(O-\underset{R}{\overset{R}{Si}}\right)_p-(CH_2)_q-\left(O\right)_t-[A]_k-Z$$ (I)

wherein
   p=1 to 10,
   q=1 to 12,
   t=0 or 1,
   k=2 or 3,
   A is a phenyl or cyclohexyl ring which may be the same or different and are bonded together in para positions,
   R=a $C_{1-3}$ alkyl group which may be the same or different,
   X=a $C_{1-12}$ alkyl group, and
   Z=F, Cl, Br, I, CN, $NH_2$, $NO_2$, $NMe_2$, NCS, $CH_3$, $OCH_3$, $CF_3$, $OCF_3$, $CH_2F$, or $CHF_2$;
   (c) at least one polarisable linear molecule having an alkyl chain, the molecule having the general formula III:

D-A'$_k$-Y  (III)

wherein:
   D stands for a $C_{1-16}$ straight chained alkyl or alkoxy group optionally containing one or more double bonds;
   k=2 or 3,
   A' is a phenyl, cyclohexyl, pyrimidine, 1,3-dioxane, or 1,4-bicyclo[2,2,2]octyl ring, wherein each A' may be the same or different and are bonded together in para positions, the terminal ring attached to Y optionally being a phenyl, and
   Y is located in the para position of the terminal ring of the group A'$_k$ and is selected from $C_{1-16}$ straight chained alkyl, $C_{1-16}$ straight chained alkoxy, $OCHF_2$, $OCOCH_3$, $COCH_3$, or Z as defined above in connection with formula 1; and (d) at least one side chain liquid crystal polysiloxane of the general formula IV:

$$Y-R_2SiO-\left[\begin{array}{c}R\\|\\Si-O\\|\\R\end{array}\right]_a\left[\begin{array}{c}R\\|\\Si-O\\|\\(CH_2)_m\\|\\(O)_t-[A]_k-Z\end{array}\right]_b\left[\begin{array}{c}R\\|\\Si-O\\|\\H\end{array}\right]_c SiR_2-Y \quad (IV)$$

wherein:
- a, b and c each independently have a value of 0 to 100 and are such that a+b+c has an average value in the range 3 to 200; and a is such that the chain units of the formula $Y-R_2SiO-[SiR_2-O]_a$ represents 0 to 25 mole percentage of the compound of the general formula IV, and c is such that the units of the formula chain $-[SiHR-O]_c-R_2SiO-Y$ represents 0 to 15 mole percentage of the compound of the general formula IV,
- m=3 to 20;
- t=0 or 1,
- k=2 or 3,
- A is a phenyl or cyclohexyl ring which may be the same or different and the rings are bonded together in para positions,
- R=a $C_{1-3}$ alkyl group, each of which may be the same or different, and
- Y=a $C_{1-12}$ alkyl group, a chromophore or a calamitic liquid crystal group and each of which may be the same or different, and
- Z is as defined above in connection with formula I, and wherein component (B) comprises:
(b) at least one quaternary ammonium salt of the general formula II:

$$T\overset{R3}{\underset{R1}{\overset{|}{-}N^+-R2}}\quad Q^- \quad (II)$$

wherein:
- T=a methyl group or a silyl or siloxane group and v=1 to 30,
- R1, R2 and R3, which may be the same or different, are $C_{1-4}$ alkyl,
- $Q^-$ is an oxidatively stable ion;

and wherein the amounts and nature of the components are selected such that the composition possesses smectic A layering and siloxane-rich sub-layering, as detected by X-ray diffraction.

8. A smectic A composition as claimed in claim 7, wherein the composition comprises in weight %:
- 25-75% in total of at least one siloxane component (a);
- 0.001-1% in total of at least one quaternary ammonium salt component (b); 20-65% in total of at least one polarisable linear molecule component (c); and
- 2-20% in total of component (d).

9. A smectic A composition as claimed in claim 1, which further comprises:
(D)(i) one or more viscosity adjusting materials present in an amount of up to 10%.

10. A smectic A composition as claimed in claim 1, which further comprises as additive (D)(ii):
at least one birefringence-altering additive, optionally selected from the group consisting of:

[Structure: $R-(O)_n$-naphthyl-C≡C-phenyl-CN]

where R=$C_{1-10}$ alkyl, n=0 or 1,

[Structure: $R-(O)_n$-phenyl-C≡C-phenyl(L)-C≡C-phenyl(L,L)-X]

where R=$C_{1-10}$ alkyl, n=0 or 1, L is selected from hydrogen or $C_{1-3}$ alkyl, and X=CN, F, NCS, $CF_3$, $OCF_3$ or $C_{1-6}$ alkyl,

[Structure: R-phenyl-phenyl-phenyl-CN]

where R is a $C_{1-10}$ alkyl group,

[Structure: R-cyclohexyl-phenyl-CN]

where R=a $C_{1-10}$ alkyl group,

[Structure: R-cyclohexyl-cyclohexyl-CN]

where R=a $C_{1-10}$ alkyl group, or

[Structure: R-pyranyl-cyclohexyl-CN (with dioxane ring)]

where R=a $C_{1-10}$ alkyl group, which is may be present in an amount of up to 50% by weight of the total weight of the composition.

11. A smectic A composition as claimed in claim 1, which further comprises as additive (D)(iii):
at least one polymer for improving the pigment dispersion and temperature stability of the smectic A composition, and/or for preventing the accumulation of pigment particles on electrodes, and/or for improving the cell mechanical stability and the stability of electro-optic performance in the case of plastic substrates.

12. A smectic A composition as claimed in claim 1, having a birefringence in the range 0.15 to 0.4 at 20° C. and 589 nm, and which is opaque in the disordered state and is clear in the ordered state.

13. A smectic A composition as claimed in claim 1, wherein the pigment particles comprise absorptive pigment particles, emissive pigment particles or a mixture thereof.

14. A smectic A composition as claimed in claim 13, wherein the pigment particles comprise particles of a single color or wherein the pigment particles comprise particles of a mixture of colors, wherein the color includes red, green, blue, orange, yellow, violet, brown, white or black.

15. A smectic A composition as claimed in claim 1, having a birefringence in the range 0.07 to 0.15 at 20° C. and 589 nm, and which is translucent in the disordered state and clear in the ordered state.

16. A cell comprising a pair of opposed spaced-apart electrodes at least one of which is light transmitting, and a smectic A composition as claimed in claim 1 located between the electrodes.

17. A cell as claimed in claim 16, which forms a single optical element or multiple pixelated optical elements.

18. A cell as claimed in claim 16, which forms multiple pixelated optical elements that are individually addressable thereby allowing the cell to display information.

19. A cell as claimed in claim 16, wherein the spacing between the electrodes is in the range of 1-100 microns.

20. A cell as claimed in claim 16, that has a front and a back, wherein
the pair of electrodes comprises (1) a light-transmitting electrode located at the front through which the smectic A composition of the cell can be observed by a user, and (2) a rear electrode located at the back.

21. A cell as claimed in claim 20, wherein the rear electrode is reflective and reflects radiation incident on it back through the cell.

22. A cell as claimed in claim 21, wherein the reflective electrode is a lambertian or specular reflector.

23. A cell as claimed in claim 20, wherein the rear electrode is transparent, and the rear of the cell includes a surface that can transmit light through the cell, or the surface is light emissive, the reflective or emissive surface optionally being coloured and/or bearing information.

24. A cell as claimed in claim 16, wherein each of the electrodes is supported on a substrate, which is optionally rigid or flexible.

25. An optical device comprising at least one cell as claimed in claim 16.

26. An optical device as claimed in claim 25, which comprises multiple pixelated optical elements that may be addressed individually.

27. An optical device as claimed in claim 25, which comprises a stack composed of two or more cells stacked on top of each other, and wherein the smectic A composition in each cell is selected to exhibit a low birefringence in the range of 0.08 to 0.15 at 20° C. and 589 nm.

28. A method of switching a cell containing a composition as claimed in claim 1 sandwiched between a pair of electrodes, the switching being from one state to a more ordered state, which method comprises applying an alternating electric field between the electrodes having a relatively high frequency of at least 500 Hz.

29. A method of switching a cell containing a composition as claimed in claim 1 sandwiched between a pair of electrodes, the switching being from one state to a more disordered state, which method comprises applying an alternating electric field having a relatively low frequency of less than 500 Hz or a non-alternating electric field between the electrodes.

* * * * *